Feb. 4, 1941.　　　M. L. HEBERT　　　2,230,749
TRACTOR
Filed Aug. 4, 1937　　　2 Sheets-Sheet 2

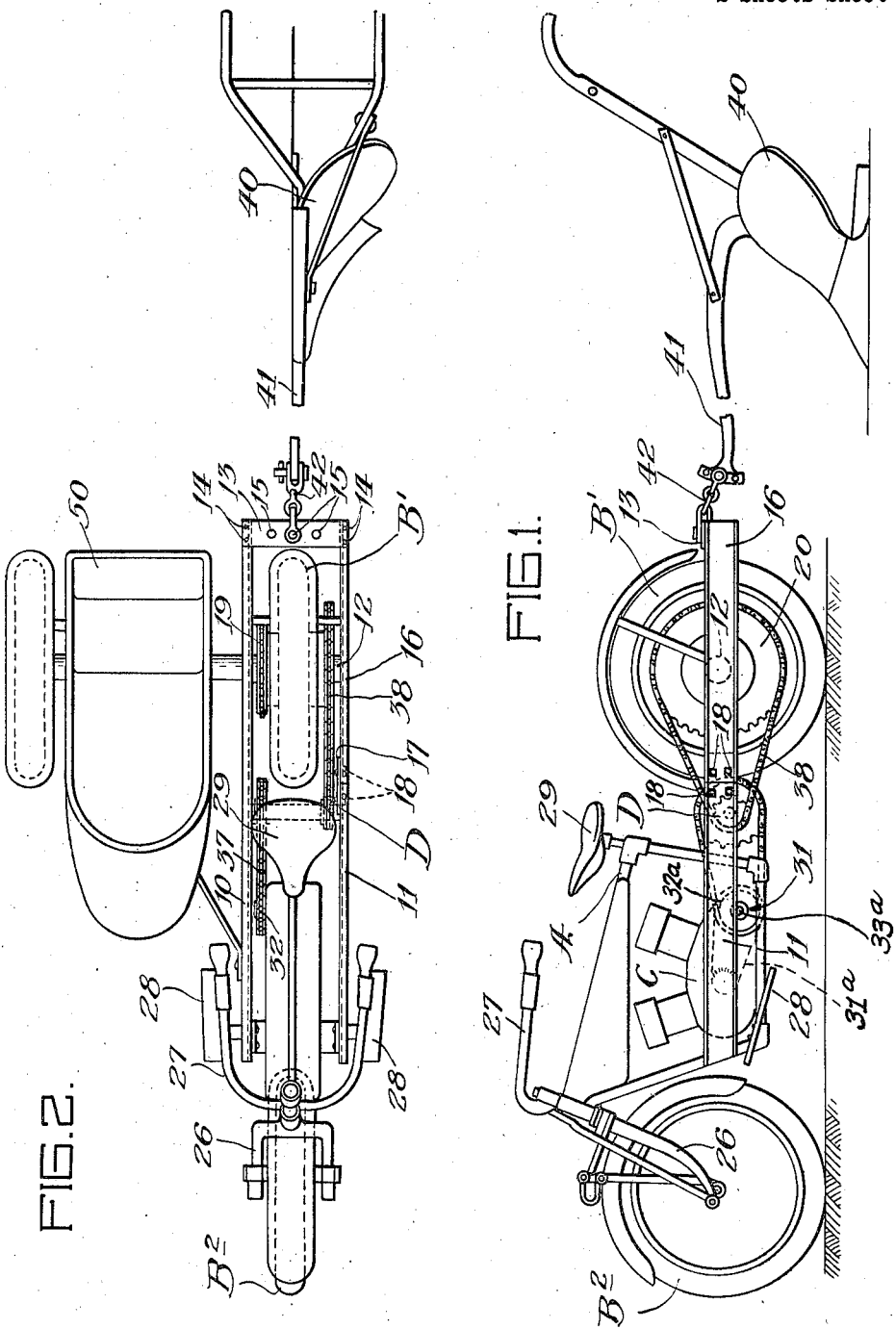

Inventor:
Malcolm L. Hebert,
By
Attorneys

Patented Feb. 4, 1941

2,230,749

UNITED STATES PATENT OFFICE 2,230,749

TRACTOR

Malcolm L. Hebert, Elmhurst, Ill.

Application August 4, 1937, Serial No. 157,399

5 Claims. (Cl. 180—30)

This invention relates to an improved type tractor which is adapted to be used for pulling farm implements and the like, and which may also be used as a transportation vehicle.

An object of the invention is to provide a two-wheel-in-line bicycle-type tractor adapted to pull a plow or other implement, and which may readily be changed for use as a road vehicle for passenger purposes.

Another object of the invention is to provide a two-wheel-in-line tractor which has improved gearing means for transmitting the power to the rear wheel of the vehicle.

Still another object of the invention is to provide a tractor having a single drive wheel and having a frame which may be easily opened to allow removal of the drive wheel or the substitution of a double drive wheel.

The use of such a two wheel vehicle for transportation purposes has been common for many years, but to my knowledge no vehicle of this type has been so constructed as to be successfully operated as a tractor. It is a considerable expense to maintain a tractor of the conventional type merely for plowing and cultivating a small tract of land, and when the vehicle which serves as a tractor can be easily converted to serve also as an economical means of transportation, this represents a great convenience and also a great saving in expense. Here a single investment is made to serve a double purpose.

Figure 3:
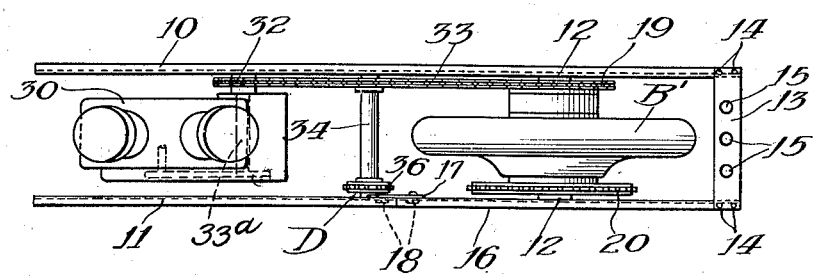
Figure 4:
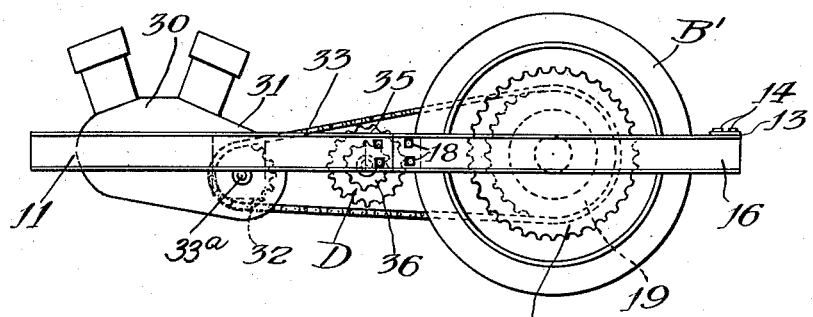
Figure 5:
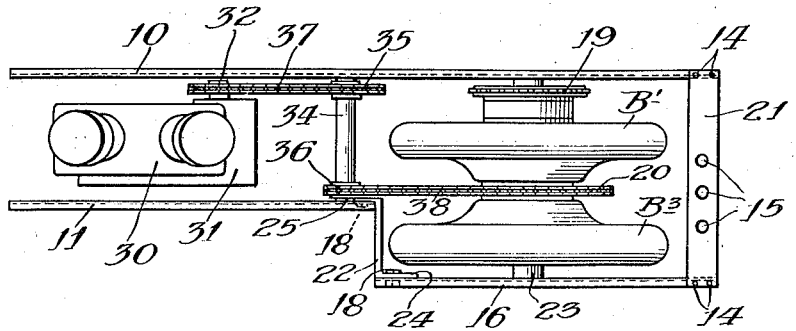

The construction which I employ is more clearly understood with reference to the accompanying drawings, in which:

Figure 1 is a side view in elevation of a type of my improved tractor as used for pulling a plow; Figure 2, a plan view of the device connected as a tractor to pull a plow as in Figure 1, and having a side car attached; Figure 3, a detail plan view showing the drive mechanism connected for relatively high speed road service; Figure 4, a side elevational view of the drive mechanism connected as shown in Figure 3; Figure 5, a plan view of the frame and drive mechanism, the frame being extended to accommodate a double rear wheel, and the drive mechanism being shown connected for operation as a tractor; and Figure 6, a side elevational view of the mechanism as illustrated in Figure 5.

As illustrated, A designates a frame in which are mounted the wheels B¹ and B², the rear wheel being used for drive purposes and the front wheel B² being used for steering purposes; C designates the power means carried in the frame; and D the drive means by which the power is transmitted to the wheel B¹ in the use of the device as a tractor.

The frame A comprises the two parallel side members 10 and 11 between which extends the pinion 12 which carries the rear wheel B¹. These members extend rearwardly beyond the rear wheel B¹ and are connected at their extreme ends by the draw bar 13 which is secured to members 10 and 11 by the bolts 14. This draw bar is provided with the apertures 15 which are adapted to receive a clevis pin for hitching a plow or other implement. Other means may be provided for hitching an implement at the rear end of the frame if so desired.

The side member 11 is formed in two parts and the rear part, designated by the character 16, is made fast to the forward portion by means of the stud 17 extending on one side of member 11 and secured to each portion by the bolt 18. The members 10 and 11 may be made of channel iron or any other suitable material.

The rear wheel B¹ may be of the general type commonly used for motorcycles, and is equipped on its right side with a sprocket 19 ordinarily used in driving the wheel for transportation. On its left side wheel B¹ is equipped with a second sprocket 20 through which the wheel is driven when the vehicle is operated as a tractor. Sprocket 20 is larger and contains more teeth than does the ordinary drive sprocket 19.

Figure 6:
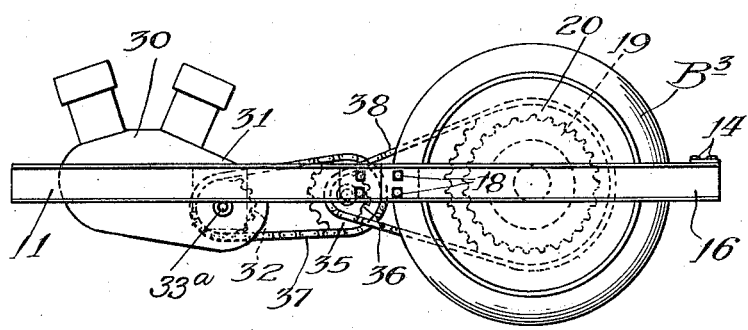

A second rear wheel B³ may be attached at the side of the wheel B¹ by following the wheel arrangement illustrated in Figures 5 and 6. To change the frame to accommodate the second rear wheel B³ it is necessary only to move stud 17 and draw bar 13 and after the second wheel B³ is securely fastened at the side of wheel B¹, portion 16 of the frame member 11 may be again secured by the use of a longer draw bar 21 and a second connector 22. The pinion 23 provided by wheel B³ is received into the portion 16 as was the pinion 12 in the frame arrangement shown in Figure 3 for the single wheel. The extension connector 22 is equipped with front and rear flanges 24 and 25, respectively, and by the use of bolt 18 the member portion 16 may again be secured to forward portion of member 11 but at a different spacing from the other side member 10. Thus connected the frame will easily accommodate the double rear wheel arrangement provided by wheels B¹ and B³.

The front wheel B² is of an ordinary type commonly used in two wheel vehicles and is mounted in the fork 26. The steering means 27 is secured with this form and is effective for turning the wheel in one direction or another to steer the vehicle. As in bicycles generally, the person operating the vehicle may sit on the seat 29, his feet resting upon foot rest 28 and his hands grasping the steering means 27. It will be apparent that the operator could not assume such posture except in my two-wheel-in-line type of tractor.

As illustrated, the power means C comprises an internal combustion engine 30 of two cylinders which is adapted to deliver power to the transmission 31 for driving the sprocket 32. As in the ordinary motorcycle construction, the transmission 31 comprises any suitable means for decreasing the speed and increasing the power delivered from the engine. Thus, the transmission 31 may include a chain 31a connecting the engine crankshaft with a sprocket 32a. The sprocket 32a may be mounted on a transverse shaft 33a, which also carries the drive sprocket 32. The power means C is of the type ordinarily used in motorcycles of common make, and may be of any suitable size or number of cylinders. I have found, however, that only a small engine as a single cylinder engine supplies sufficient power, when adapted according to this invention, to pull a plow of the single furrow type.

When the device is driven as a means of transportation, a chain 33 connects the drive sprocket 32 with the rear wheel sprocket 19, and the rear wheel is then driven at relatively high speeds.

The drive mechanism D comprises a jack shaft 34 which is mounted in any suitable way between the members 10 and 11 and between the power means and the drive wheel. This shaft is provided with a sprocket 35 which is aligned with the drive sprocket 32, and is provided at its left end with a small sprocket 36 which is aligned with the rear wheel sprocket 20.

When my improved tractor is to be converted into a passenger vehicle, it is necessary only to disconnect chains 37 and 38 and connect sprockets 32 and 19 with a long chain 33. This gear arrangement comprises an extremely simple and efficient way of delivering power from the means C to drive the vehicle at ordinary road speed, so as to enable its use for passenger purposes. With this latter gearing connection the vehicle may attain road speeds of 60 miles an hour or even higher.

When operated as a tractor the frame may be assembled to accommodate but the single wheel B¹, or may be changed to accommodate the double wheel as illustrated in Figures 5 and 6, if so desired. In either case the drive for tractor use is transmitted from the power means to the jack shaft by the chain 37 and from the jack shaft to the sprocket 20 by the chain 38.

I have found that my improved vehicle could be used very successfully for pulling a walking plow 40 as illustrated in Figure 1, the plow beam 41 being connected by the clevis device 42 with the draw bar 13. For most purposes the device may be successfully operated with but a single rear wheel B¹, but for some purposes where it may be difficult to maintain traction, the frame may be changed to the arrangement shown in Figures 5 and 6 and a double rear wheel composed of wheels B¹ and B³ provided. This arrangement provides increased support which is effective in maintaining traction of the vehicle when such additional ground contact becomes necessary.

Also, the frame may be quickly opened to permit the removal of the rear wheel through the side of the frame simply by removing the portion 16 of member 11. Such frame arrangement is highly convenient when it becomes necessary to make tire repairs to install a different type of wheel or tire.

If desired, and for use under certain conditions, a side car attachment 50 may be added to the vehicle, as illustrated in Figure 2. Also other means of additional support may be attached either to the tractor or to the implements used in connection with it. Such attachment, however, has not been found necessary except for certain purposes.

Because the two wheels of my improved type tractor are aligned, it leaves only one track and this is of especial advantage when the tractor is used over cultivated ground. Such a vehicle is of special value when cultivating corn after the corn has attained a substantial height, and the tractor may be driven between the rows to pull a cultivator. In fact, this tractor is of special use wherever work is to be done in narrow places.

Since the improved tractor is of simple construction and has a very low cost of manufacture, and also because it is adaptable for transportation use as well as for tractor use, the use of the tractor is made available to a great many farmers of small tracts of land who could not afford to own or maintain the conventional type of tractor.

While I have described a specific embodiment of my invention it will be apparent that many changes may be made in the construction without departing from the spirit of my invention. For example, while I have shown a construction which is especially adapted for pulling an implement, it is apparent that the structure may be easily changed to adapt the tractor for pushing an implement.

The foregoing detailed description has been given for clearness of understanding only, and no unnecessary limitations should be understood therefrom, but the appended claims should be construed as broadly as permissible, in view of the prior art.

I claim:

1. A combination vehicle of the character described comprising, a frame, a pair of aligned wheels mounted in said frame, power means mounted in said frame, a drive sprocket adapted to be actuated by said power means, a driven sprocket fixedly mounted on one of said wheels, chain means for connecting said driven sprocket to said drive sprocket, a second driven sprocket fixedly mounted on the same wheel as the first driven sprocket, a jack shaft equipped with at least a pair of sprockets of different sizes, chain means for connecting the smaller of said sprockets to said second driven sprocket and chain means for connecting the larger of said pair of sprockets to said drive sprocket.

2. In combination with a vehicle having a frame and equipped with drive means including a drive sprocket actuated by power means, a driven sprocket secured to the drive wheel of said vehicle, chain means for connecting said drive sprocket to said driven sprocket, tractor drive mechanism including a jack shaft mounted transversely in said frame and having a relatively large intermediate sprocket at its one end, said relatively large sprocket being aligned with said drive sprocket, chain means for connecting said drive sprocket with said large sprocket, said jack shaft having at its other end a relatively small intermediate sprocket, and a second driven sprocket secure with said drive wheel and aligned with said small intermediate sprocket, and chain means for connecting said small intermediate sprocket with said second driven sprocket.

3. A tractor of the character described comprising a frame, a pair of wheels mounted in said frame, power means mounted in said frame, a drive sprocket carried by said frame, transmission means for delivering power from said power means to said drive sprocket, tractor drive means equipped with different sized sprockets and with chain means for connecting said drive sprocket with said jack shaft and said jack shaft with one of said wheels to drive said wheel at a relatively low speed for enabling the operation of said vehicle as a farm tractor, and drive means for connecting said drive sprocket directly to one of said wheels for driving said wheel at a relatively high speed so that the vehicle may be operated as a passenger vehicle.

4. A tractor of the character described comprising a frame, a pair of aligned wheels mounted in said frame, power means mounted in said frame, a drive sprocket carried by said frame, transmission means for delivering power from said power means to said drive sprocket, tractor drive means mounted transversely in said frame and equipped with a sprocket and chain means for connecting the jack shaft in drive relation with said drive sprocket and also including a second sprocket on said jack shaft and chain means for connecting said second sprocket in drive relation with one of said wheels, said tractor drive means being adapted to drive said wheel at a relatively low speed for operation of said vehicle as a tractor, and drive means including a sprocket and chain means for connecting said last-mentioned sprocket to said drive sprocket, said drive means being adapted to drive one wheel at a relatively high speed for operation of the vehicle as a passenger conveyance.

5. In combination with a vehicle having a frame and equipped with drive means including a drive sprocket actuated by power means, a driven sprocket fixedly secured to the drive wheel of said vehicle, chain means for connecting said drive sprocket and said driven sprocket, tractor drive mechanism including a jack shaft mounted transversely in said frame, a relatively large intermediate sprocket on said drive shaft, said relatively large sprocket being aligned with said drive sprocket, chain means for connecting said relatively large sprocket with said drive sprocket, a relatively small intermediate sprocket on said drive shaft, a second driven sprocket secure with said drive wheel and aligned with said small intermediate sprocket, and chain means for connecting said second driven sprocket to said small intermediate sprocket.

MALCOLM L. HEBERT.